(12) United States Patent
Izumi et al.

(10) Patent No.: US 9,346,714 B2
(45) Date of Patent: May 24, 2016

(54) POROUS MATERIAL AND HONEYCOMB STRUCTURE

(71) Applicant: NGK Insulators, Ltd., Nagoya (JP)

(72) Inventors: Yunie Izumi, Nagoya (JP); Yoshimasa Kobayashi, Nagoya (JP)

(73) Assignee: NGK Insulators, Ltd., Nagoya-City (JP)

( * ) Notice: Subject to any disclaimer, the term of this patent is extended or adjusted under 35 U.S.C. 154(b) by 0 days.

(21) Appl. No.: 14/476,813

(22) Filed: Sep. 4, 2014

(65) Prior Publication Data

US 2014/0370233 A1 Dec. 18, 2014

Related U.S. Application Data

(63) Continuation of application No. PCT/JP2013/059144, filed on Mar. 27, 2013.

(30) Foreign Application Priority Data

Mar. 28, 2012 (JP) ................. 2012-073708

(51) Int. Cl.
*C04B 35/565* (2006.01)
*B01D 46/24* (2006.01)
(Continued)

(52) U.S. Cl.
CPC .............. *C04B 35/565* (2013.01); *B01D 39/20* (2013.01); *B01D 46/00* (2013.01); *B01D 53/86* (2013.01); *B01J 35/04* (2013.01); *C03C 10/0045* (2013.01); *C04B 35/6316* (2013.01); *C04B 38/00* (2013.01); *C04B 38/0006* (2013.01); *F01N 3/021* (2013.01); *B01D 46/2418* (2013.01); *B01D 2046/2437* (2013.01); *B01D 2255/2092* (2013.01); *B01D 2255/65* (2013.01);
(Continued)

(58) Field of Classification Search
None
See application file for complete search history.

(56) References Cited

U.S. PATENT DOCUMENTS 2,652,354 A * 9/1953 Dryden et al. ............... 502/439
3,849,145 A * 11/1974 Pitha ..................... C04B 35/565
501/88

(Continued)

FOREIGN PATENT DOCUMENTS

| EP | 1 568 669 A1 | 8/2005 |
| GB | 1423596 A * | 2/1976 |
| JP | 07-315933 A1 | 12/1995 |
| JP | 2003-176185 A1 | 6/2003 |
| JP | 2003176185 A * | 6/2003 |
| JP | 4111439 B2 | 7/2008 |
| JP | 4227347 B2 | 2/2009 |
| JP | 2010-502546 A1 | 1/2010 |
| WO | 2008/027423 A2 | 3/2008 |

OTHER PUBLICATIONS

U.S. Appl. No. 14/196,411.*

(Continued)

*Primary Examiner* — David Sample
*Assistant Examiner* — Nicholas W Jordan
(74) *Attorney, Agent, or Firm* — Burr & Brown, PLLC

(57) ABSTRACT

There are disclosed a porous material having a high thermal shock resistance and a honeycomb structure. The porous material contains main aggregates and auxiliary aggregates as aggregates, the main aggregates are silicon carbide particles, the auxiliary aggregates are at least either of mullite particles or alumina particles, the aggregates are bound to one another via a binding phase, so as to form pores, and the binding phase is at least one of an amorphous phase and a cordierite phase, and a porosity is from 40 to 90%. Furthermore, the honeycomb structure is constituted of such a porous material, and includes partition walls defining and forming a plurality of cells extending from one end face to the other end face.

7 Claims, 1 Drawing Sheet

(51) Int. Cl.
  *F01N 3/022* (2006.01)
  *C04B 35/63* (2006.01)
  *C03C 10/00* (2006.01)
  *B01D 39/20* (2006.01)
  *B01D 46/00* (2006.01)
  *B01D 53/86* (2006.01)
  *B01J 35/04* (2006.01)
  *C04B 38/00* (2006.01)
  *F01N 3/021* (2006.01)
  *C04B 111/00* (2006.01)

(52) U.S. Cl.
  CPC . *B01D2255/9202* (2013.01); *B01D 2255/9205* (2013.01); *B01D 2258/012* (2013.01); *C04B 2111/0081* (2013.01); *C04B 2111/00793* (2013.01); *C04B 2235/3217* (2013.01); *C04B 2235/3218* (2013.01); *C04B 2235/349* (2013.01); *C04B 2235/3418* (2013.01); *C04B 2235/3463* (2013.01); *C04B 2235/3481* (2013.01); *C04B 2235/5436* (2013.01); *C04B 2235/80* (2013.01); *C04B 2235/96* (2013.01); *F01N 3/022* (2013.01); *Y10T 428/24149* (2015.01)

(56) References Cited

U.S. PATENT DOCUMENTS

| | | | | |
|---|---|---|---|---|
| 4,973,564 | A | * | 11/1990 | Chyung et al. ............ 428/312.6 |
| 5,497,620 | A | * | 3/1996 | Stobbe ............... B01D 46/2429 |
| | | | | 55/523 |
| 2003/0148063 | A1 | * | 8/2003 | Morimoto et al. ............ 428/116 |
| 2005/0143255 | A1 | | 6/2005 | Morimoto et al. |
| 2006/0029768 | A1 | | 2/2006 | Furukawa et al. |
| 2006/0121239 | A1 | * | 6/2006 | Furukawa et al. ............ 428/116 |
| 2008/0057268 | A1 | | 3/2008 | Lu et al. |
| 2009/0065982 | A1 | | 3/2009 | Morimoto et al. |
| 2009/0131253 | A1 | * | 5/2009 | Fujii et al. .................... 502/340 |
| 2011/0185690 | A1 | * | 8/2011 | Jousseaume et al. ........... 55/523 |

OTHER PUBLICATIONS

U.S. Appl. No. 14/476,804.*
U.S. Appl. No. 14/064,487.*
International Search Report and Written Opinion (Application No. PCT/JP2013/059144) dated Jun. 25, 2013.
European Search Report, European Application No. 13768571.5, dated Nov. 11, 2015 (5 pages).

* cited by examiner

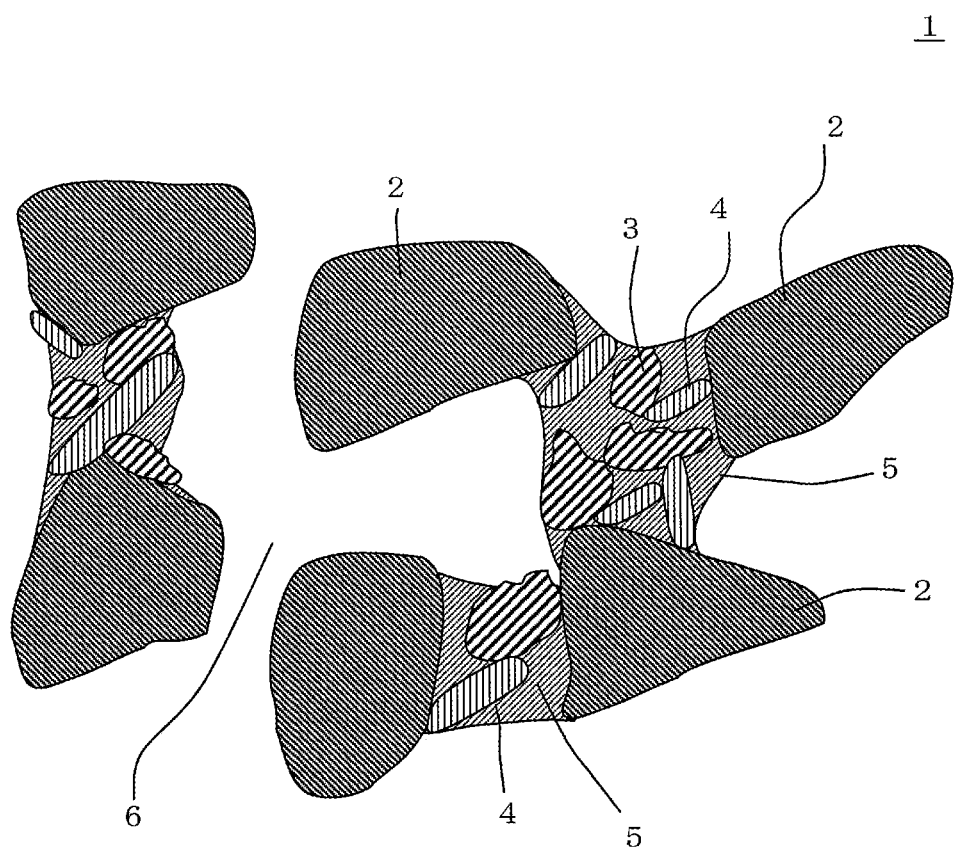

POROUS MATERIAL AND HONEYCOMB STRUCTURE

BACKGROUND OF THE INVENTION

1. Field of the Invention

The present invention relates to a porous material and a honeycomb structure. More particularly, it relates to a porous material having a high thermal shock resistance and a honeycomb structure.

2. Description of Related Art

A porous material in which silicon carbide particles are bound by an oxide phase, a glass phase or the like has an excellent thermal shock resistance, and hence the porous material is utilized as a material for a catalyst carrier, a material for a diesel particulate filter (DPF) or the like (e.g., see Patent Documents 1 to 3). Furthermore, as a refractory material, there is used a material in which silicon carbide particles are bound by an oxide phase (e.g., see Patent Document 4).

CITATION LIST

Patent Documents

[Patent Document 1] JP-A-2010-502546
[Patent Document 2] JP 4111439
[Patent Document 3] JP 4227347
[Patent Document 4] JP-A-H07-315933

SUMMARY OF THE INVENTION

Problems to be Solved by the Invention

In recent years, for a catalyst carrier and a DPF, their sizes have been enlarged, and their cell structures have further been complicated. In addition, use environments of the catalyst carrier and the DPF have been severe. Therefore, as to porous materials for use in such use applications, further improvement of a thermal shock resistance is required. Moreover, it is considered that the refractory material described in Patent Document 4 has a low porosity and therefore is not used in the DPF or the like.

The present invention has been developed to solve such problems, and a main object is to provide a porous material having a high thermal shock resistance and a honeycomb structure.

Means for Solving the Problem

To solve the abovementioned problems, according to the present invention, there are provided a porous material and a honeycomb structure in the following.

According to one aspect of the present invention, a porous material containing main aggregates and auxiliary aggregates as aggregates is provided, wherein the main aggregates are silicon carbide particles, the auxiliary aggregates are at least either of mullite particles or alumina particles, the aggregates are bound to one another via a binding phase so as to form pores, the binding phase contains at least one of an amorphous phase and a cordierite phase, and a porosity is from 40 to 90%.

According to a second aspect of the present invention, the porous material according to the above first aspect is provided, which contains 8.0 to 35.0 mass % of the auxiliary aggregates to a total mass of the main aggregates, the auxiliary aggregates and the binding phase.

According to a third aspect of the present invention, the porous material according to the above first or second aspects is provided, which contains 2.0 to 15.0 mass % of the binding phase to the total mass of the main aggregates, the auxiliary aggregates and the binding phase.

According to a fourth aspect of the present invention, the porous material according to any one of the above first to third aspects is provided, wherein the amorphous phase contains magnesium, aluminum, silicon and oxygen.

According to a fifth aspect of the present invention, the porous material according to any one of the above first to fourth aspects is provided, wherein an average pore diameter is from 10 to 40 µm.

According to a sixth aspect of the present invention, the porous material according to any one of the above first to fifth aspects is provided, wherein a percentage of the pores having pore diameters smaller than 10 µm is 20% or less of all the pores, and a percentage of the pores having pore diameters in excess of 40 µm is 10% or less of all the pores.

According to a seventh aspect of the present invention, the porous material according to any one of the above first to sixth aspects is provided, wherein an average particle diameter of the silicon carbide particles which are the main aggregates is from 5 to 100 µm, and an average particle diameter of the auxiliary aggregates is from 5 to 100 µm.

According to an eighth aspect of the present invention, the porous material according to any one of the above first to seventh aspects is provided, wherein a bending strength is 6.5 MPa or more, and a bending strength/Young's modulus ratio is $1.4 \times 10^{-3}$ or more.

According to a ninth aspect of the present invention, a honeycomb structure which is constituted of the porous material according to any one of the above first to eighth aspects is provided, and which includes partition walls defining and forming a plurality of cells extending from one end face to the other end face.

SUMMARY OF THE INVENTION

A porous material of the present invention has a more excellent thermal shock resistance than a conventional porous material.

BRIEF DESCRIPTION OF THE DRAWINGS

FIG. 1 is an enlarged schematic view showing a cross section of one embodiment of a porous material of the present invention.

DETAILED DESCRIPTION OF THE INVENTION

Hereinafter, an embodiment of the present invention will specifically be described. It should be understood that the present invention is not limited to the following embodiment and that the following embodiment to which a change, an improvement or the like is suitably added on the basis of knowledge of a person skilled in the art without departing from the gist of the present invention also falls in the scope of the present invention.

(1) Porous Material:

A porous material of the present invention contains main aggregates and auxiliary aggregates as aggregates, and the aggregates are bound to one another via a binding phase so as to form pores. Furthermore, the main aggregates are silicon carbide particles, and the auxiliary aggregates are at least either of mullite particles or alumina particles. Furthermore, the binding phase contains at least one of an amorphous phase and a cordierite phase. Furthermore, in the porous material of the present invention, a porosity is from 40 to 90%. FIG. 1 is an enlarged schematic view showing a cross section of one embodiment of the porous material of the present invention. A porous material 1 of the present embodiment shown in FIG. 1 is an example in which aggregates 2 are bound to one another via a binding phase 5 so as to form pores 6, and mullite particles 4 and alumina particles 3 are contained as the auxiliary aggregates.

Here, when only the amorphous phase binds the aggregates to one another, the amorphous phase is the "binding phase". Furthermore, when only the cordierite phase bonds the aggregates to one another, the cordierite phase is the "binding phase". Furthermore, when "both the amorphous phase and the cordierite phase" bond the aggregates to one another, "both the amorphous phase and the cordierite phase" are the "binding phases". Furthermore, the binding phase may contain another phase, other than "the amorphous phase and the cordierite phase". Furthermore, "the binding phase" binds the aggregates to one another in a state where a space between the aggregates is not completely filled (not filled without any hollow), but hollows (pores) are formed between the aggregates. Furthermore, the main aggregates are the aggregates contained at a ratio in excess of 50 mass % in all the aggregates. The auxiliary aggregates are remaining aggregates obtained by removing the main aggregates from all the aggregates. It is to be noted that a binding material may contain a rare earth element represented by yttrium (Y), lanthanum (La) or the like.

The porous material of the present invention has such a constitution as described above, and hence the porous material has a high bending strength and a high "bending strength/Young's modulus ratio". Therefore, the porous material of the present invention has an excellent thermal shock resistance.

As described above, the porous material of the present invention contains the silicon carbide particles, and further contains at least either of mullite particles or alumina particles. Furthermore, the silicon carbide particles contained in the porous material are referred to as the main aggregates, and "the mullite particles, the alumina particles, or both the mullite particles and the alumina particles" contained in the porous material are referred to as the auxiliary aggregates.

In the porous material of the present invention, the porosity is from 40 to 90% and preferably from 50 to 70%. When the porosity is smaller than 40%, a pressure loss unfavorably increases. Especially, when the porosity is 50% or more, the porous material has a low pressure loss favorable for use in a DPF or the like. Furthermore, when the porosity is in excess of 90%, a mechanical strength unfavorably lowers. Especially, when the porosity is 70% or less, the porous material has a high mechanical strength favorable for use in a DPF or the like. In the present description, the porosity is a value calculated from a total pore volume (unit: $cm^3/g$) by mercury porosimetry (in conformity with JIS R 1655) and an apparent density (unit: $g/cm^3$) by an underwater Archimedes method. To calculate the porosity, there is used an equation "the porosity [%]=the total pore volume/{(1/the apparent density)+the total pore volume}×100". It is to be noted that the porosity can be regulated by, for example, an amount of a pore former used when the porous material is produced, an amount of a sintering agent, a firing atmosphere or the like. Furthermore, the porosity can be regulated by a ratio between the aggregates and the binding phase.

In the porous material of the present invention, a bulk density is preferably from 0.25 to 2.3 $g/cm^3$ and further preferably from 0.8 to 2.0 $g/cm^3$. When the bulk density is smaller than 0.25 $g/cm^3$, the mechanical strength unfavorably lowers. Furthermore, when the bulk density is in excess of 2.3 $g/cm^3$, a mass unfavorably becomes large for use in the DPF to be mounted on a vehicle, or the like. In particular, when the bulk density is from 0.8 to 2.0 $g/cm^3$, "a high mechanical strength and a light weight" preferable for use in the DPF or the like are both satisfied. In the present description, the bulk density is a value measured by the underwater Archimedes method.

In the porous material of the present invention, an average pore diameter is preferably from 10 to 40 μm and further preferably from 15 to 30 μm. When the average pore diameter is smaller than 10 μm, the pressure loss unfavorably increases. When the average pore diameter is in excess of 40 μm, a part of a particulate matter in an exhaust gas is unfavorably not trapped and penetrates the DPF or the like during the use of the porous material of the present invention as the DPF or the like. In the present description, the average pore diameter is a value measured by mercury porosimetry (in conformity with JIS R 1655).

In the porous material of the present invention, it is preferable that a percentage of the pores having pore diameters smaller than 10 μm is 20% or less of all the pores and that a percentage of the pores having pore diameters in excess of 40 μm is 10% or less of all the pores. When the percentage of the pores having the pore diameters smaller than 10 μm is in excess of 20% of all the pores, the pores having the pore diameters smaller than 10 μm are easily clogged when a catalyst is loaded, and hence the pressure loss easily increases sometimes. When a percentage of the pores having pore diameters smaller than 40 μm is in excess of 10% of all the pores, the particulate matter easily passes through the pores having the pore diameters smaller than 40 μm, and hence a function of a filter such as the DPF is not easily sufficiently exerted.

In the porous material of the present invention, the aggregates are bound to one another via the binding phase (a phase containing at least one of the amorphous phase and the cordierite phase) so as to form the pores. The binding phase is preferably at least one of the amorphous phase and the cordierite phase. The amorphous phase preferably contains magnesium, aluminum, silicon and oxygen. Further specifically, the amorphous phase is preferably an oxide including magnesium, aluminum and silicon. Furthermore, as described above, the binding phase may contain another phase, other than "the amorphous phase and the cordierite phase". Examples of the other phase include spinel, mullite, sapphirine, quartz, and cristobalite.

The porous material of the present invention preferably contains 8.0 to 35 mass % of the auxiliary aggregates to a total mass of the main aggregates, the auxiliary aggregates and the binding phase. The porous material of the present invention contains further preferably 8.0 to 20.0 mass % and especially preferably 8.0 to 12 mass % of the auxiliary aggregates to the total mass of the main aggregates, the auxiliary aggregates and the binding phase. When a content (a content ratio) of the auxiliary aggregates is smaller than 8.0 mass %, the bending strength lowers, "the strength/Young's modulus ratio" further lowers, and the thermal shock resistance deteriorates sometimes. When the content of the auxiliary aggregates is in excess of 35 mass %, "the strength/Young's modulus ratio" lowers, and the thermal shock resistance deteriorates sometimes.

The content ratio of the auxiliary aggregates is a value obtained on the basis of a value obtained by X-ray diffraction analysis. Specifically, the content ratio is calculated by simple quantitative analysis "in which X-ray diffraction data is analyzed by using an RIR (Reference Intensity Ratio) method to quantify the respective components". The X-ray diffraction data is preferably analyzed by using, for example, "X-ray data analysis software JADE7" manufactured by MDI Co. An example of an X-ray diffractometer for use in the X-ray diffraction analysis is a rotary counter cathode type X-ray diffractometer (RINT manufactured by Rigaku Corporation).

In the porous material of the present invention, an average particle diameter of the silicon carbide particles which are the main aggregates is preferably from 5 to 100 μm and further preferably from 10 to 40 μm. When the average particle diameter is smaller than 5 μm, a firing shrinkage during production of the porous material by firing becomes large and the porosity of the porous material is smaller than 40% sometimes. When the average particle diameter is larger than 100 μm, a percentage of the pores in excess of 40 μm in the porous material is 10% or more of all the pores sometimes.

In the porous material of the present invention, an average particle diameter of alumina which is the auxiliary aggregate is preferably from 1 to 100 μm and further preferably from 5 to 20 μm. When the average particle diameter is smaller than 1 μm, the alumina particles are incorporated into the binding material and dispersed in the binding material, which heightens Young's modulus of the binding material. Therefore, the Young's modulus of the porous material heightens, the bending strength/Young's modulus ratio lowers and the thermal shock resistance deteriorates sometimes. When the average particle diameter is larger than 100 μm, a percentage of the pores in excess of 40 μm in the porous material becomes 10% or more of all the pores sometimes.

In the porous material of the present invention, an average particle diameter of mullite which is the auxiliary aggregate is preferably from 1 to 100 μm and further preferably from 5 to 40 μm. When the average particle diameter is smaller than 1 μm, the mullite particles are incorporated into the binding material and the mullite particles are dispersed in the binding material, which heightens the Young's modulus of the binding material. Therefore, the Young's modulus of the porous material heightens, the bending strength/Young's modulus ratio lowers and the thermal shock resistance deteriorates sometimes. When the average particle diameter is larger than 100 μm, the percentage of the pores in excess of 40 μm in the porous material is 10% or more of all the pores sometimes.

The average particle diameters of the silicon carbide particles, alumina and mullite are values measured by using a scanning type electron microscope (SEM). Specifically, the porous material included in a resin is subjected to mirror polishing by use of a diamond slurry to obtain an observation sample, and this polished face in a cross section is observed at a magnification of 1500 times by the SEM, thereby obtaining a microstructure photograph. Then, particle diameters of all of the silicon carbide particles and the alumina and mullite particles in the microstructure photograph are measured, and a value obtained by averaging the particle diameters by the number of each type of particles in the microstructure photograph is obtained as the average particle diameter of each type of particles.

The porous material of the present invention preferably contains 2.0 to 15.0 mass % of the binding phase to the total mass of the main aggregates, the auxiliary aggregates and the binding phase. Furthermore, the porous material contains further preferably 2.0 to 13.0 mass % and especially preferably 5.0 to 12.0 mass % of the binding phase. When the content of the binding phase is smaller than 2.0 mass %, the thermal shock resistance deteriorates sometimes. Also when the content of the binding phase is larger than 15.0 mass %, the thermal shock resistance deteriorates sometimes.

In the porous material of the present invention, it is preferable that the bending strength is 6.5 MPa or more and "the bending strength (Pa)/Young's modulus (Pa) ratio" is preferably $1.4 \times 10^{-3}$ or more. It is to be noted that the higher bending strength is better, but an upper limit is about 50 MPa due to a constitution of the present invention. Furthermore, it is further preferable that the bending strength is from 6.5 to 20 MPa and "the bending strength (Pa)/Young's modulus (Pa) ratio" is from $1.4 \times 10^{-3}$ to $5.0 \times 10^{-3}$. When the bending strength, the Young's modulus and "the bending strength (Pa)/Young's modulus (Pa) ratio" are in the above ranges, the thermal shock resistance of the porous material can be improved. When the bending strength is smaller than 6.5 MPa, the thermal shock resistance deteriorates sometimes. In the present description, the bending strength is a value measured by a bending test in conformity with JIS R 1601. Furthermore, in the present description, the Young's modulus is a value calculated from a stress-strain curve obtained in the abovementioned "bending test in conformity with JIS R1601".

In the porous material of the present invention, a linear thermal expansion coefficient at 40 to 800° C. is preferably $2.0 \times 10^{-6}$/K or more and $6.0 \times 10^{-6}$/K or less and further preferably $3.5 \times 10^{-6}$/K or more and $5.2 \times 10^{-6}$/K or less. There is nothing better than a small linear thermal expansion coefficient, but a lower limit is $2.0 \times 10^{-6}$/K due to the constitution of the present invention. Furthermore, when the linear thermal expansion coefficient is larger than $6.0 \times 10^{-6}$/K, the thermal shock resistance deteriorates sometimes. In the present description, the thermal expansion coefficient is a value measured by a method in conformity with JIS R 1618. Specifically, a test piece having a size of 3 vertical cells×3 horizontal cells×20 mm length is cut out from a honeycomb structure, and the value of the thermal expansion coefficient is measured at 40 to 800° C. in an A-axis direction (a direction parallel to through channels of the honeycomb structure).

(2) Honeycomb Structure:

The honeycomb structure of the present invention is constituted of the abovementioned porous material of the present invention, and includes partition walls defining and forming "a plurality of cells extending from one end face to the other end face". The above cells become through channels of a fluid. Furthermore, the honeycomb structure is preferably a structure having a circumferential wall positioned in an outermost circumference. A thickness of the partition walls is preferably from 30 to 1000 μm, further preferably from 50 to 500 μm, and especially preferably from 50 to 200 μm. A cell density is preferably from 10 to 200 cells/cm², further preferably from 20 to 200 cells/cm², and especially preferably from 50 to 150 cells/cm².

There is not any special restriction on a shape of the honeycomb structure, and examples of the shape include a cylindrical shape, and a tubular shape including a bottom surface having a polygonal shape (a triangular shape, a quadrangular shape, a pentangular shape, a hexagonal shape or the like).

There is not any special restriction on a shape of the cells of the honeycomb structure. Examples of the cell shape in a cross section perpendicular to a cell extending direction include a polygonal shape (a triangular shape, a quadrangular shape, a pentangular shape, a hexagonal shape, a heptagonal shape, an octagonal shape or the like), a circular shape, or any combination of these shapes.

A size of the honeycomb structure can suitably be determined in accordance with a use application.

The honeycomb structure of the present invention can be used as the DPF or a catalyst carrier. Furthermore, the catalyst is also preferably loaded onto the DPF.

(3) Production Method for Porous Material (Honeycomb Structure):

Hereinafter, a production method for the porous material of the present invention will be described. The production method for the porous material described in the following is also a method of producing the honeycomb structure constituted of the porous material.

First, the silicon carbide powder which become the main aggregates, powder which becomes the auxiliary aggregates and powder which becomes the binding phase (binding material powder) are mixed, and a binder, a surfactant, a pore former, water and the like are added as needed, to prepare a forming raw material. When mullite is used as the auxiliary aggregates, mullite powder is mixed, or a mullite forming raw material is mixed. Here, the mullite forming raw material means a raw material which forms mullite crystals after firing. Furthermore, when alumina is used as the auxiliary aggregates, alumina powder is mixed. Furthermore, an example of the powder which becomes the binding phase (the binding material powder) is a cordierite forming raw material. Here, the cordierite forming raw material means a raw material which forms cordierite crystals (a cordierite phase) after firing. When the binding phase is the cordierite phase, the binding material powder is preferably the cordierite forming raw material. Furthermore, when the binding phase is the amorphous phase, the binding material powder preferably has a silica-rich blend composition. Here, when "the binding material powder has the silica-rich blend composition", it is meant that a content of silica in the binding material powder is 51.4 mass % or more.

A content of the powder which becomes the auxiliary aggregates is preferably from 8.0 to 35 mass % of a total mass of the silicon carbide powder, the powder which becomes the auxiliary aggregates and the binding material powder. An average particle diameter of the silicon carbide powder is preferably from 5 to 100 µm and further preferably from 10 to 40 µm. When alumina powder is used as the powder which becomes the auxiliary aggregates, an average particle diameter of the alumina powder is preferably from 1 to 100 µm and further preferably from 5 to 20 µm. When mullite powder is used as the powder which becomes the auxiliary aggregates, an average particle diameter of the mullite powder is preferably from 1 to 100 µm and further preferably from 5 to 40 µm. The average particle diameter is a value measured by a laser diffraction method. When both the alumina powder and the mullite powder are used as the powder which becomes the auxiliary aggregates, a mass ratio of the alumina powder to the whole powder which becomes the auxiliary aggregates is preferably from 25 to 90 mass %.

A mass ratio of the binding material powder to the total mass of the silicon carbide powder, the powder which becomes the auxiliary aggregates and the binding material powder is preferably from 5.0 to 15.0 mass %.

Examples of the binder include organic binders such as methylcellulose, hydroxypropoxyl cellulose, hydroxyethyl cellulose, carboxymethyl cellulose and polyvinyl alcohol. In these examples, methylcellulose and hydroxypropoxyl cellulose are preferably used together. A content of the binder is preferably from 2 to 10 mass % of the whole forming raw material.

As the surfactant, ethylene glycol, dextrin, fatty acid soap, polyalcohol or the like can be used. One of these surfactants may be used alone or any combination of two or more of the surfactants may be used. A content of the surfactant is preferably 2 mass % or less of the whole forming raw material.

There is not any special restriction on the pore former as long as the pore former may form the pores after firing, and examples of the pore former include graphite, starch, resin balloons, a water absorbable resin, and a silica gel. A content of the pore former is preferably 10 mass % or less of the whole forming raw material. An average particle diameter of the pore former is preferably from 10 to 30 µm. When the average particle diameter is smaller than 10 µm, the pores cannot sufficiently be formed sometimes. When the average particle diameter is larger than 30 µm, the die is clogged sometimes during the forming. The average particle diameter of the pore former is a value measured by the laser diffraction method. It is to be noted that when the pore former is the water absorbable resin, the average particle diameter is a value after water is absorbed.

A content of the water is suitably regulated so that a kneaded material has such a hardness that the kneaded material is easily formed, but the content of the water is preferably from 20 to 60 mass % of the whole forming raw material.

Next, the forming raw material is kneaded to form the kneaded material. There is not any special restriction on a method of kneading the forming raw material to form the kneaded material, and an example of the method is a method in which a kneader, a vacuum pugmill or the like is used.

Next, the kneaded material is extruded to form a honeycomb formed body. In the extrusion, the die having desirable whole shape, cell shape, partition wall thickness, cell density and the like is preferably used. A material of the die is preferably cemented carbide which does not easily wear away. The honeycomb formed body is a structure having porous partition walls defining and forming a plurality of cells which become through channels of a fluid and a circumferential wall positioned in an outermost circumference. The partition wall thickness, cell density, circumferential wall thickness and the like of the honeycomb formed body can suitably be determined in accordance with the structure of the honeycomb structure to be prepared, in consideration of shrinkages during drying and firing.

The honeycomb formed body obtained in this manner is preferably dried prior to the firing. There is not any special restriction on a drying method, and examples of the method include electromagnetic heating systems such as microwave heating drying and high-frequency dielectric heating drying, and external heating systems such as hot air drying and superheated steam drying. In these methods, it is preferable that a predetermined amount of water content is dried by the electromagnetic heating system and then the remaining water content is dried by the external heating system, because the whole formed body can rapidly and evenly be dried so that any cracks are not generated. As drying conditions, it is preferable that 30 to 99 mass % of water content is removed from an amount of the water content prior to the drying by the electromagnetic heating system and then the water content is reduced to 3 mass % or less by the external heating system. As the electromagnetic heating system, the dielectric heating drying is preferable, and as the external heating system, the hot air drying is preferable.

Next, when a length of the honeycomb formed body in a central axis direction is not a desirable length, both end faces (both end portions) are preferably cut to obtain the desirable length. There is not any special restriction on a cutting method, but an example of the method is a method in which a round saw cutter or the like is used.

Next, the honeycomb formed body is fired to prepare the honeycomb structure. Prior to the firing, calcinating is preferably performed to remove the binder and the like. The calcinating is preferably performed at 200 to 600° C. in the air atmosphere for 0.5 to 20 hours. In the firing, heating is preferably performed at 1300 to 1600° C. and at ordinary pressure in a non-oxidizing atmosphere of nitrogen, argon or the like (an oxygen partial pressure is $10^{-4}$ atm or less) for one to 20 hours. Furthermore, after the firing, an oxidation treatment may be performed on conditions at 1100 to 1400° C. in the air atmosphere (steam may be included) for one to 20 hours, to improve a durability. It is to be noted that the calcinating and the firing can be performed by using, for example, an electric furnace, a gas furnace or the like.

EXAMPLES

Hereinafter, the present invention will further specifically be described in accordance with examples, but the present invention is not limited to these examples.

Example 1

Silicon carbide (SiC) powder, alumina powder and binding material powder were mixed at a ratio (a mass ratio) of 100:17:19. To the obtained mixture, a binder and a pore former were added and water was also added to obtain a forming raw material. As the binder, hydroxypropyl methylcellulose was used. As the pore former, starch and a water absorbable resin were used. As the binding material powder, a mixture of talc powder, aluminum hydroxide powder and silica powder was used. The binding material powder is a powder which becomes a binding phase. It is to be noted that by firing, the alumina powder reacts with a silica component in the binding material powder, whereby mullite is generated as auxiliary aggregates.

A content of the binder was 7 parts by mass, when a total of the silicon carbide powder and the alumina powder was 100 parts by mass. A content of the pore former was 12 parts by mass, when a total of the silicon carbide powder, the alumina powder and "a component (silica) which became mullite in the binding material powder" was 100 parts by mass. A content of the water was 60 parts by mass, when the total of the silicon carbide powder, the alumina powder and "the component (silica) which became mullite in the binding material powder" was 100 parts by mass. An average particle diameter of the silicon carbide powder was 25 µm. An average particle diameter of the alumina powder was 12 µm. Furthermore, an average particle diameter of the pore former was 25 µm. Additionally, the average particle diameters of the silicon carbide powder, the alumina powder and the pore former are values measured by a laser diffraction method.

Next, the forming raw material was kneaded and pugged to prepare a columnar kneaded material. Then, the obtained columnar kneaded material was formed into a honeycomb shape by use of an extrusion machine, to obtain a honeycomb formed body. The obtained honeycomb formed body was dried by dielectric heating and then dried at 120° C. for two hours by use of a hot air dryer, to obtain a honeycomb dried body.

The obtained honeycomb dried body was degreased at 550° C. in the air atmosphere for three hours, and then fired at about 1450° C. in an Ar inert atmosphere for two hours to obtain a honeycomb structure porous material (a honeycomb structure).

In the honeycomb structure at this time, a thickness of partition walls was 300 µm and a cell density was 46.5 (cells/cm²). Furthermore, the shape of the honeycomb structure was a quadrangular columnar shape in which one side of a bottom surface was 35 mm, and a length of the honeycomb structure in a cell extending direction was 40 mm. Furthermore, the binding phase was an amorphous phase.

Identification of silicon carbide, alumina, mullite, a cordierite phase and the amorphous phase was performed together with identification/quantitative analysis of a constitutional phase (a constitutional component) by powder XRD, on the basis of the results of qualitative analysis by an electron probe microanalyzer (EPMA) and element mapping. In consequence, it was confirmed that the honeycomb structure of Example 1 included silicon carbide particles, alumina, mullite and the amorphous phase. A content ratio of the binding phase to the whole structure was 8.0 mass %. Constitutional elements of the amorphous phase were magnesium (Mg), aluminum (Al), silicon (Si), iron (Fe), and oxygen (O). The constitutional elements of the amorphous phase were identified by the following method.

A porosity of the obtained honeycomb structure porous material (the honeycomb structure) was 64.8%, a bulk density was 1.13 g/cm³, and an average pore diameter was 14.0 µm. Furthermore, a total pore volume of the honeycomb structure porous material (the honeycomb structure) was 0.567 cm³/g. Furthermore, "a volume ratio of pores of 10 µm or less" of the honeycomb structure porous material (the honeycomb structure) was 17.5%, and "a volume ratio of pores of 40 µm or more" was 4.3%. Furthermore, a bending strength of the honeycomb structure was 7.0 MPa, Young's modulus was 2.8 GPa, and "a strength/Young's modulus ratio" was $2.5 \times 10^{-3}$. Additionally, "strength" of "the strength/Young's modulus ratio" is "the bending strength". Furthermore, a thermal expansion coefficient of the honeycomb structure (at 40 to 800° C.) was $5.1 \times 10^{-6}$ $K^{-1}$. The obtained results are shown in Table 1. Additionally, respective measurement values are values obtained by methods described in the following.

In Table 1, columns of "SiC", "alumina", "mullite" and "binding phase" indicate respective mass ratios of silicon carbide particles, alumina particles, mullite particles and the binding phase to a total mass of the silicon carbide particles, the alumina particles, the mullite particles and the binding phase. Furthermore, columns of "porosity", "bulk density" and "average pore diameter" indicate the porosity, bulk density and average pore diameter of the porous material. Furthermore, columns of "bending strength", "Young's modulus" and "thermal expansion coefficient" indicate the bending strength, Young's modulus and thermal expansion coefficient of the porous material. Furthermore, a column of "strength/Young's modulus ratio" indicates a value obtained by dividing the bending strength (Pa) by the Young's modulus (Pa).

Furthermore, in Table 1, column of "general evaluation" A to C indicate pass and D indicates fail. Furthermore, of A to C, "A" indicates the most excellent thermal shock resistance. Furthermore, "B" indicates a less excellent thermal shock resistance than "A" and "C" a less excellent thermal shock resistance than "B". Additionally, "D" indicates a poor thermal shock resistance.

As conditions of the general evaluation A, there are satisfied all the conditions that the bending strength is 6.5 or more and "the strength/Young's modulus ratio" is 1.9 or more. Furthermore, as conditions of the general evaluation B, there are satisfied all the conditions that the bending strength is 6.5 or more and "the strength/Young's modulus ratio" is in excess of 1.5 and smaller than 1.9. Furthermore, as conditions of the general evaluation C, there are satisfied all the conditions that the bending strength is 6.5 or more and "the strength/Young's modulus ratio" is from 1.4 to 1.5. Furthermore, as conditions of the general evaluation D, there is satisfied one of requirements that the bending strength is smaller than 6.5 and that "the strength/Young's modulus ratio" is smaller than 1.4.

(Mass Ratio of Silicon Carbide Particles)

The mass ratio of the silicon carbide particles was obtained by X-ray diffraction analysis. Specifically, an X-ray diffraction pattern of the porous material is obtained by using an X-ray diffractometer. As the X-ray diffractometer, a rotary counter cathode type X-ray diffractometer (RINT manufactured by Rigaku Corporation) is used. Conditions of X-ray diffractometry are set to a CuKα ray source, 50 kV, 300 mA, and 2θ=10 to 60°. Furthermore, as an analysis method of the obtained X-ray diffraction data, there is used simple quantitative analysis "in which the X-ray diffraction data is analyzed by using an RIR (Reference Intensity Ratio) method to quantify the respective components". Furthermore, the X-ray diffraction data is analyzed by using "X-ray data analysis software JADE7" manufactured by MDI Co.

(Mass Ratio of Mullite Particles)

A mass ratio of the mullite particles is obtained by a method similar to the above method of obtaining "the mass ratio of the silicon carbide particles".

(Mass Ratio of Alumina Particles)

A mass ratio of the alumina particles is obtained by a method similar to the above method of obtaining "the mass ratio of the silicon carbide particles".

(Mass Ratio of Binding Phase)

When the binding phase is the cordierite phase, a mass ratio of the binding phase is obtained by a method similar to the above method of obtaining "the mass ratio of the silicon carbide particles". When the binding phase is the amorphous phase, the mass ratio of the binding phase is obtained from a ratio of an X-ray diffraction strength of a sample in which an amount of the amorphous phase is known to that of the vicinity of 2θ=25° of the sample.

(Constitutional Elements of Amorphous Phase)

The identification of the constitutional elements of the amorphous phase is performed together with the identification/quantitative analysis of the constitutional phase (the constitutional component) by the powder XRD (X-ray analysis), on the basis of the results of the qualitative analysis by the electron probe microanalyzer (EPMA) and element mapping. In the powder XRD, a device of trade name RINT manufactured by Rigaku Corporation was used. The conditions of the X-ray diffractometry were set to the CuKα ray source, 50 kV, 300 mA, and 2θ=10 to 60°. As the EPMA, a device of a trade name JXA8800 manufactured by JEOL Ltd. was used. Conditions of the EPMA were set to an acceleration voltage of 15 kV, a beam diameter of 50 nm and an irradiation current of 100 nA, and a view field observed at a magnification of 3000 times was analyzed.

(Porosity)

The porosity is calculated from a total pore volume $[cm^3/g]$ by mercury porosimetry (in conformity with JIS R 1655) and an apparent density $[g/cm^3]$ measured by Archimedes method. To calculate the porosity, there is used an equation "an open porosity (%)=100× the total pore volume/{(1/the apparent density)+the total pore volume}".

(Bulk Density)

The bulk density is measured by an underwater Archimedes method (in conformity with JIS R 1626).

(Average Pore Diameter)

The average pore diameter is measured by the mercury porosimetry (in conformity with JIS R 1655).

(Pore Volume and Pore Volume Ratio)

The pore volume and the pore volume ratio are measured by the mercury porosimetry (in conformity with JIS R 1655).

(Bending Strength (Strength))

There is processed a test piece (5 vertical cells×10 horizontal cells×40 mm length) having, as a longitudinal direction, a direction in which the cells pass through the honeycomb structure, and the bending strength of the honeycomb structure is calculated by a bending test in conformity with JIS R 1601.

(Young's Modulus)

"A stress-strain curve" is prepared by the above measuring method of "the bending strength" and a tilt of the "stress-strain curve" is calculated. The obtained "tilt of the stress-strain curve" is the Young's modulus.

(Thermal Expansion Coefficient)

The thermal expansion coefficient is measured in conformity with JIS R1618. Specifically, a test piece having a size of 3 vertical cells×3 horizontal cells×20 mm length is cut out from the honeycomb structure, and an average linear thermal expansion coefficient (the thermal expansion coefficient) is measured at 40 to 800° C. in an A-axis direction (a direction parallel to through channels of the honeycomb structure).

TABLE 1

| | Porous material composition | | | | | | | Porous material properties | | | |
|---|---|---|---|---|---|---|---|---|---|---|---|
| | Aggregates | Auxiliary aggregates | | | Binding phase | | | | Bulk density $g/cm^3$ | Ave. pore dia. μm | Total pore volume $cm^3/g$ |
| | SiC Mass % | Alumina Mass % | Mullite Mass % | Auxiliary aggregate amount Mass % | Type | Elements contained in amorphous phase | Mass % | Porosity % | | | |
| Example 1 | 81.5 | 9.4 | 1.1 | 10.5 | Amorphous phase | Mg, Al, Si, Fe, O | 8.0 | 64.8 | 1.13 | 14.0 | 0.567 |
| Example 2 | 83.2 | 8.4 | 1.6 | 10.0 | Cordierite phase Amorphous phase | Mg, Al, Si, Fe, O | 6.8 | 63.8 | 1.16 | 13.9 | 0.550 |
| Example 3 | 80.4 | 5.2 | 4.3 | 9.5 | Amorphous phase | Mg, Al, Si, Fe, O | 10.1 | 62.7 | 1.20 | 14.4 | 0.533 |
| Example 4 | 79.9 | 2.5 | 5.9 | 8.4 | Amorphous phase | Mg, Al, Si, Fe, O | 11.7 | 62.2 | 1.18 | 15.2 | 0.527 |
| Example 5 | 78.7 | 1.3 | 7.2 | 8.5 | Amorphous phase | Mg, Al, Si, Fe, O | 12.8 | 62.1 | 1.24 | 15.3 | 0.516 |
| Example 6 | 80.3 | 0.0 | 17.6 | 17.6 | Amorphous phase | Mg, Al, Si, Fe, O | 2.1 | 59.6 | 1.24 | 13.3 | 0.444 |
| Example 7 | 75.3 | 16.8 | 0.0 | 16.8 | Amorphous phase | Mg, Al, Si, Fe, O | 7.9 | 62.1 | 1.24 | 10.1 | 0.496 |

TABLE 1-continued

| | | | | | | | | | | | |
|---|---|---|---|---|---|---|---|---|---|---|---|
| Example 8 | 54.4 | 10.7 | 21.4 | 32.2 | Amorphous phase | Mg, Al, Si, O | 13.4 | 63.3 | 1.20 | 10.0 | 0.511 |
| Example 9 | 62.0 | 3.9 | 23.4 | 27.3 | Amorphous phase | Mg, Al, Si, O | 10.7 | 60.8 | 1.28 | 10.4 | 0.468 |
| Comparative Example 1 | 84.0 | 0.0 | 0.0 | 0.0 | Cordierite phase | — | 16.0 | 64.5 | 1.11 | 18.3 | 0.599 |

| | Porous material properties | | | | | | |
|---|---|---|---|---|---|---|---|
| | Volume ratio of pores of 10 μm or less % | Volume ratio of pores of 40 μm or more % | Bending strength MPa | Young's modulus GPa | Strength/ Young's modulus ratio ($\times 10^{-3}$) | Thermal expansion coefficient (40-800° C.) ($\times 10^{-6}$) /K | General evaluation |
| Example 1 | 17.5 | 4.3 | 7.0 | 2.8 | 2.5 | 5.1 | A |
| Example 2 | 19.5 | 3.6 | 7.8 | 3.5 | 2.3 | 5.0 | A |
| Example 3 | 16.4 | 3.9 | 9.2 | 4.4 | 2.1 | 4.8 | A |
| Example 4 | 10.6 | 4.0 | 9.9 | 4.6 | 2.2 | 4.7 | A |
| Example 5 | 9.0 | 4.0 | 10.4 | 5.7 | 1.8 | 4.7 | B |
| Example 6 | 13.2 | 4.5 | 15.3 | 8.7 | 1.8 | 4.6 | B |
| Example 7 | 47.4 | 3.4 | 6.5 | 3.6 | 1.8 | 5.1 | B |
| Example 8 | 61.0 | 3.5 | 7.7 | 5.1 | 1.5 | 4.9 | C |
| Example 9 | 44.0 | 2.8 | 8.3 | 5.6 | 1.5 | 5.6 | C |
| Comparative Example 1 | 16.2 | 7.1 | 3.0 | 1.5 | 2.0 | 4.2 | D |

Examples 3 to 9

The porous materials (honeycomb structures) were prepared in the same manner as in Example 1 except that respective conditions were set as shown in Table 1. Respective evaluations were performed in the same manner as in Example 1. The results are shown in Table 1.

Example 2

The porous material (honeycomb structure) was prepared in the same manner as in Example 1 except that firing conditions were set as follows and the other conditions were set as shown in Table 1. Respective evaluations were performed in the same manner as in Example 1. The results are shown in Table 1.

(Firing)

An obtained honeycomb dried body was degreased at 550° C. in the air atmosphere for three hours, and then fired at about 1480° C. in an Ar inert atmosphere for two hours, to obtain a honeycomb structure porous material (the honeycomb structure).

Comparative Example 1

The porous material (honeycomb structure) was prepared in the same manner as in Example 1 except that a forming raw material was prepared as follows, firing conditions were set as follows, and the other conditions were set as shown in Table 1. Respective evaluations were performed in the same manner as in Example 1. The results are shown in Table 1.

(Preparation of Forming Raw Material)

Silicon carbide (SiC) powder and binding material powder were mixed at a ratio (a mass ratio) of 100:20. To the obtained mixture, a binder and a pore former were added and water was also added to obtain a forming raw material. As the binder, hydroxypropyl methylcellulose was used. As the pore former, starch and a water absorbable resin were used. As the binding material powder, a mixture of talc powder, aluminum hydroxide powder and silica powder was used. The binding material powder is a powder which becomes a binding phase.

(Firing)

An obtained honeycomb dried body was degreased at 550° C. in the air atmosphere for three hours, and then fired at about 1450° C. in an Ar inert atmosphere for two hours, to obtain a honeycomb structure porous material (the honeycomb structure).

It is seen from Table 1 that the porous materials of Examples 1 to 9 have an excellent thermal shock resistance. Furthermore, it is seen that the porous material of Comparative Example 1 has a poor thermal shock resistance.

INDUSTRIAL APPLICABILITY

The porous material of the present invention can be utilized as a material for a catalyst carrier, a material for a DPF or the like. Furthermore, the honeycomb structure of the present invention can be utilized as a catalyst carrier, a DPF or the like.

DESCRIPTION OF REFERENCE NUMERALS

1: porous material, 2: silicon carbide (SiC) particle, 3: alumina particle, 4: mullite particle, 5: binding phase, and 6: pore (fine pore).

The invention claimed is:

1. A porous material containing main aggregates and auxiliary aggregates as aggregates,
   wherein the main aggregates are silicon carbide particles,
   the auxiliary aggregates are at least one of mullite particles and alumina particles,
   the aggregates are bound to one another via a binding phase so as to form pores,
   the main aggregates are bridged by the binding phase,
   the average particle diameter of the main aggregates is greater than the average particle diameter of the auxiliary aggregates,
   the binding phase contains at least one of an amorphous phase and a cordierite phase,
   a porosity is from 40 to 90%, and
   the porous material contains 8.4 to 10.5 mass % of the auxiliary aggregates to a total mass of the main aggregates, the auxiliary aggregates and the binding phase, and 6.8 to 11.7 mass % of the binding phase to the total mass of the main aggregates, the auxiliary aggregates and the binding phase.

2. The porous material according to claim 1, wherein the amorphous phase contains magnesium, aluminum, silicon and oxygen.

3. The porous material according to claim 1, wherein an average pore diameter is from 10 to 40 μm.

4. The porous material according to claim 1, wherein a percentage of the pores having pore diameters smaller than 10 μm is 20% or less of all the pores, and a percentage of the pores having pore diameters in excess of 40 μm is 10% or less of all the pores.

5. The porous material according to claims 1, wherein an average particle diameter of the silicon carbide particles which are the main aggregates is from 5 to 100 μm, and an average particle diameter of the auxiliary aggregates is from 5 to 100 μm.

6. The porous material according to claim 1, wherein a bending strength is 6.5 MPa or more, and a bending strength/Young's modulus ratio is $1.4 \times 10^{-3}$ or more.

7. A honeycomb structure which is constituted of the porous material according to claim 1, and which comprises partition walls defining and forming a plurality of cells extending from one end face to the other end face.

* * * * *